United States Patent [19]

Rydberg

[11] Patent Number: 5,402,317
[45] Date of Patent: Mar. 28, 1995

[54] METHOD AND MEANS FOR ISOLATING EQUIPMENT FROM SHOCK LOADS

[75] Inventor: Allan Rydberg, Sterling, Conn.

[73] Assignee: The United States of America as represented by the Secretary of the Navy, Washington, D.C.

[21] Appl. No.: 174,926

[22] Filed: Dec. 29, 1993

[51] Int. Cl.⁶ .............................................. H01R 23/68
[52] U.S. Cl. ................................ 361/785; 174/17 LF
[58] Field of Search ....................... 361/785–789, 361/613, 676, 677, 687, 688, 689, 699; 174/17 LF; 439/59, 60–62

[56] References Cited

U.S. PATENT DOCUMENTS 3,701,197 10/1972 Vers .
4,271,458 6/1981 George, Jr. .
4,556,473 12/1985 Kohno et al. .
4,630,808 12/1986 Ushijima et al. .
4,847,731 7/1989 Smolley .............................. 361/761
5,193,046 3/1993 Lemke et al. ................... 360/97.02

Primary Examiner—Bot LeDynh
Attorney, Agent, or Firm—Michael J. McGowan; Prithvi C. Lall; James M. Kasischke

[57] ABSTRACT

The current invention is a method and apparatus for shock mounting an object in a container. A container is provided having side walls to accommodate movement of the object. The container is filled with a fluid having substantially the same density as the object to be shock mounted. The object is mounted in the container by a plurality of shock mounts. In accordance with the apparatus, a container is provided with an incompressible fluid therein. The object to be shock mounted is immersed in the fluid and suspended at an equilibrium position in the fluid filled container. The object can be a circuit board or some other similarly delicate device.

6 Claims, 1 Drawing Sheet

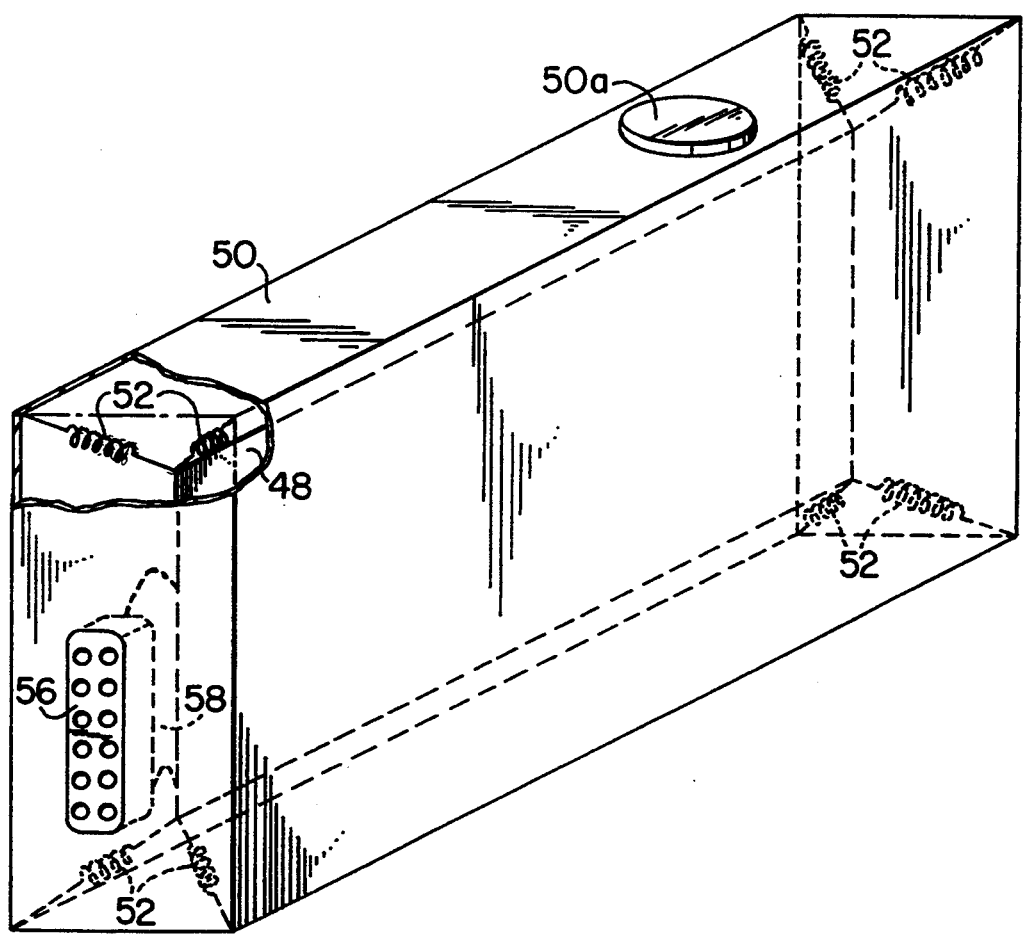

METHOD AND MEANS FOR ISOLATING EQUIPMENT FROM SHOCK LOADS

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates to isolating equipment from mechanical shock loads and more specifically to a method and apparatus for suspending an object or an equipment element in a fluid having substantially the same density as that of the object or equipment being isolated from shock loads.

(2) Description of the Prior Art

Shock to a component occurs when the component experiences a sudden deceleration. For example, when a component is dropped on a hard surface, the component experiences a deceleration of as much as 100G. This deceleration causes the weight of the object to increase by the same factor as the acceleration. In the case of circuit boards, a deceleration of this magnitude will destroy the bonding between the semiconductor chips and the circuit board.

Shock mounting avoids sudden variations in acceleration. This can be accomplished by applying the acceleration over a longer period of time such as by mounting the object on springs or other elastomers. This method effectively reduces the acceleration to values within an acceptable tolerance. However such a method requires a great deal of space in the mounting since the object must continue moving while the space defining structure is essentially stationary. Shock mounting can also be accomplished by providing an equal and opposite force to counter the shock.

Most prior art shock mounting systems isolate the equipment with a system of springs or dampers designed to limit the transmission of shocks from the mounting to the equipment.

Electronic components have been provided in a shock mounted case by means of a plurality of elastomeric mounting devices as shown for example in U.S. Pat. No. 4,937,806 issued to Babson et al. The prior art also teaches that mounting devices can be provided with a fluid filled cavity component such that these devices are suitable for use in isolating a vehicles engine from the vehicle body for example, see Kato et al U.S. Pat. No. 4,946,147. Hirazawa U.S. Pat. No. 5,009,404 also discloses a fluid filled elastic mount suitable for use as an engine mount.

Hamburgen et al. U.S. Pat. No. 5,130,889 discloses an integrated circuit protection system achieved by encapsulation of the component in a low viscosity liquid. The properly selected liquid protects the electrical connections while the use of a low viscosity liquid prevents stress on bonded wires caused by differing expansion coefficients. Nowhere does Hamburgen disclose any mechanical shock protection achieved by use of a fluid.

These prior art disclosures fail to show or to suggest a method or apparatus for providing a counterbalancing force on the object or component in order to shield the apparatus from mechanical shock loads.

SUMMARY OF THE INVENTION

It is a general purpose and object of the present invention to provide a method and an apparatus for isolating an object such as an electrical component from shock loads.

It is a further object to provide for the suspension of the object or electrical component inside a canister or container without the use of elastomeric shock mounts or the like, and preferably without the usual mechanical mounting required for damping or reducing vibrations by mechanical means. Rather, the present invention seeks to obviate the need for such heavy duty elastomeric mounting devices as shown for example in Babson.

Still another object of the present invention is to provide an efficiently designed suspension system for the object or electrical component such that the system counteracts virtually all shock pulses as opposed to reducing the effect of these shock pulses as taught for example in the prior art referred to previously.

Accordingly, the current invention provides a method for shock mounting an object in a container. A container is provided having side walls to accommodate movement of the object. The container is filled with a fluid having substantially the same density as the object to be shock mounted. The object is mounted in the container by a plurality of shock mounts.

The current invention also provides an apparatus for shock mounting an object. A container is provided with an incompressible fluid therein. The object to be shock mounted is immersed in the fluid and suspended at an equilibrium position in the fluid filled container. The object can be a circuit board or some other similarly delicate device.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein:

FIG. 1 is a perspective view, with a portion broken away, of a shock isolation apparatus of the current invention.

DETAILED DESCRIPTION OF THE PREFERRED EMBODIMENT

An electrical component such as a printed circuit board 48 is suspended in the cavity defined by a container or canister 50. The canister has a filler port 50a that permits the interior cavity defined by the canister 50 to be filled with a liquid selected from a group of different density liquids so as to correspond in density to the overall density of the circuit board components 48. If necessary an envelope (not shown) can be provided around the circuit board 48, and if so the density of the envelope and the circuit board must be allowed for in choosing the liquid appropriate for "floating" of the circuit board 48 in the liquid filled canister 50.

Light elastomeric bands or the equivalent are provided, as suggested generally at 52, in order to provide proper positioning and location for the circuit board 48 so that in the absence of outside forces the circuit board 48 will float in a position midway between the opposed faces of the generally rectangular canister or container 50. A connector 56 is provided on the exterior of container 50 for communication with circuit board 48 via cable 58.

In the present invention, the object to be protected is enclosed in a container and surrounded by a fluid. This method uses the buoyancy created by the fluid upon the object to provide a counterbalancing force. Mathematically, this is shown as follows:

$$F_a = MA \quad (1)$$

where:
$F_a$ is the force caused by the acceleration
M is the mass of the circuit board
A is the acceleration $$F_b = \rho V A \quad (2)$$

where:
$F_b$ is the force caused by buoyancy
$\rho$ is the density of the fluid
V is the volume of the fluid displaced
A is the acceleration To have the necessary balance $F_a$ must equal $F_b$ Accordingly, to balance the forces:

$$MA = \rho V A \quad (3)$$

Simplifying, $M = \rho V$. V is the volume of the fluid displaced, and will be the same as the volume of the submerged circuit board. The density of the fluid, $\rho$, must therefore be the same as the density of the circuit board for the forces to balance. To avoid creating any moment or force couple, the buoyant force and the force caused by the acceleration must be aligned. It is advantageous for the circuit board to have center of volume and center of gravity co-located or at least to be geometrically close to one another. The fluid should preferably be a dielectric fluid such as an oil which does not conduct electricity if the object to be mounted is an electronic device.

Therefore, as mounted in container 50 and surrounded by fluid, any inertial force on the circuit board 48 is balanced by an equivalent buoyant force provided by the fluid. Thus, circuit board 48 can withstand large accelerations without loss of the bonding between the board and its components.

It is essential that the enclosure or container utilized be rugged enough to withstand the forces generated by both the liquid and the electrical component or object being supported in the liquid in order to serve as a functional overall system satisfying the requirements for shock mounting electronic equipment generally, particularly such equipment as provided on board ship.

Many modifications and variations of the present invention may become apparent in light of the above teachings. For example, shipping containers can be fabricated in accordance with the teachings of the present invention as can standard mounting arrangements for electronic equipment aboard ship.

In light of the above, it is therefore understood that within the scope of the appended claims, the invention may be practiced otherwise than as specifically described.

What is claimed is:

1. An apparatus for providing shock load isolation comprising:
   a circuit board of predetermined overall volume and weight having a predetermined density;
   a container for said circuit board having inside dimensions which accommodate limited movement of said circuit board;
   an incompressible liquid inside said container, said liquid having substantially the same density as that of said circuit board;
   a means for mounting said circuit board in an equilibrium position suspended in said liquid filled container, said means for mounting exerting restoring forces on said circuit board which are very small in comparison to the weight of said circuit board; and
   an electrical connection means on the exterior of said container electrically connected to said circuit board.

2. Apparatus according to claim 1 wherein said container is completely sealed to prevent leakage of said liquid.

3. Apparatus according to claim 1 wherein said connection means is connected to said circuit board by a cable extending from the circuit board to a connector.

4. Apparatus according to claim 1 wherein said incompressible liquid is a dielectric fluid.

5. A method of shock mounting a circuit board comprising the steps of:
   providing a container structure for the circuit board;
   providing said container structure with side walls that define an internal space to accommodate limited movement of said circuit board within said container structure;
   filling said defined internal space with a liquid having a density such that buoyant forces on said circuit board balance the weight forces, thereby minimizing inertial forces caused by acceleration of said circuit board; and
   mounting said circuit board in said container structure by means that exerts restoring forces on said circuit board within said container structure, said restoring forces being very small compared to the weight of the circuit board;
   said mounting step serving primarily to locate said circuit board in an equilibrium position where said circuit board is spaced from the side walls of said container structure in the absence of inertial forces;
   providing a connector on the exterior of said container structure; and
   connecting said connector to said circuit board electrically.

6. The method of claim 5 wherein said liquid is a dielectric.

* * * * *